United States Patent [19]

Belove et al.

[11] Patent Number: 5,115,504
[45] Date of Patent: May 19, 1992

[54] INFORMATION MANAGEMENT SYSTEM

[75] Inventors: Edward J. Belove, Wayland; Todd R. Drake, Cambridge, both of Mass.; S. Jerrold Kaplan, San Francisco, Calif.; Mitchell D. Kapor, Brookline; Richard A. Landsman, Hingham, both of Mass.; Stephen Zagieboylo, Norfolk, Mass.

[73] Assignee: Lotus Development Corporation, Cambridge, Mass.

[21] Appl. No.: 265,683

[22] Filed: Nov. 1, 1988

[51] Int. Cl.$^5$ ............................................. G06F 15/40
[52] U.S. Cl. ................................ 395/600; 364/283.3; 364/282.3; 364/282.1; 364/974
[58] Field of Search ................. 364/200 MS File, 300, 364/900 MS File

[56] References Cited

U.S. PATENT DOCUMENTS

| | | | |
|---|---|---|---|
| 4,429,385 | 1/1984 | Cichelli et al. | 370/92 |
| 4,468,728 | 8/1984 | Wang | 364/200 |
| 4,479,196 | 10/1984 | Ferrer et al. | 364/900 |
| 4,555,771 | 11/1985 | Hayashi | 364/900 |
| 4,611,298 | 9/1986 | Schuldt | 364/900 |
| 4,688,195 | 8/1987 | Thompson et al. | 364/300 |
| 4,805,099 | 2/1989 | Huber | 364/300 |
| 4,864,497 | 9/1989 | Lowry et al. | 364/300 |
| 4,868,733 | 9/1989 | Fujisawa et al. | 364/300 |
| 4,894,771 | 1/1990 | Kunii et al. | 364/200 |
| 4,918,593 | 4/1990 | Huber | 364/200 |
| 4,930,071 | 5/1990 | Tou et al. | 364/300 |
| 4,947,320 | 8/1990 | Crus et al. | 364/200 |

OTHER PUBLICATIONS

Stonebraker, "Implementation of Integrity Constraints and Views by Query Modification", Dept. of Elec. Eng., Univ. of Calif. at Berkeley, May 1975.

Quine, "Indeterminacy of Translation Again", The Journal of Philosophy, vol. 84, No. 1, Jan. 1987.

Kaplan et al., "Interpreting Natural Language Database Updates", Computer Science Dept., Stanford Univ., Jun. 1981, pp. 139-141.

C. J. Date, "Referential Integrity", IEEE, Sep. 1981, pp. 2-12.

S. L. Enrenreich, "Query Languages: Design Recommendations Derived from the Human Factors Literature", The Human Factors Society, Dec. 1981, pp. 709-725.

S. J. Kaplan, "Cooperative Responses from a Portable Natural Language Query System", Artificial Intelligence, Oct. 1982, pp. 165-187.

A. M. Keller, "Updates to Relational Database Through Views Involving Joins", Improving Database Usability and Responsiveness, 1982, pp. 363-384.

A. M. Keller, "Choosing a View Update Translator by Dialog at View Definition Time", Univ. of Texas, Aug. 1986, pp. 467-474.

Date, "Updating Views", 1986, pp. 367-394.

P. Lyngback et al., "A Personal Data Manager", Computer Science Dept., Univ. of Southern California, Aug. 1984, pp. 14-25.

(List continued on next page.)

Primary Examiner—Gareth D. Shaw
Assistant Examiner—Maria N. Von Buhr
Attorney, Agent, or Firm—Fish & Richardson

[57] ABSTRACT

A system for linking elements representing stored information in a data base comprising a link structure formed in a section of the data base independent of the elements, a pointer in the link structure indicating the location of a first element, and a second pointer in the link structure indicating the location of a second element. The data base contains items comprising textual data and a plurality of categories into which the items may be categorized such that each item may be linked to more than one category. The invention automatically assigns an element in a data base to a parent category if it has been assigned to a child category of the parent. The invention will allow a user to modify data in a data base in a view mode, and will resolve ambiguities by guessing as to the most likely interpretation intended by the user. The invention will allow a user to change the number or organization of categories in the data base while the user is in a view mode.

7 Claims, 7 Drawing Sheets

OTHER PUBLICATIONS

Larson et al., "Computing Queries from Derived Relations", Dept. Comp. Science, Univ. of Waterloo, 1985, pp. 259-269.

Gershman et al., "The Dynamics of Man-Machine Interaction in a Conversational Advisory System", IEEE, 1986, pp. 721-725.

A. M. Keller, "The Role of Semantics in Translating View Updates", IEEE, Jan. 1986, pp. 63-73.

T. Whalen, "A Linguistic Inference System with Mixed-Initiative Dialog", 1986 (abstract only).

Kaplan et al., "AGENDA: A Personal Information Manager", Communications of the ACM, Nov. 9, 1987, pp. 3-22.

Lotus 1-2-3, 1987.

IZE advertisement, Lotus, Jun. 1988.

Grandview advertisement, Lotus, Jun. 1988.

Advertisement for Tornado TM, 1988.

INDEPENDENT LINK STRUCTURES

FIG. 6

FLOW CHART FOR THE GENERATION OF A NEW ITEM

1. OBTAIN FREE OBJECT. THIS WILL BECOME THE ITEM OBJECT FOR A NEW ITEM.
   ↓
2. ADD TEXTUAL DATA TO ITEM OBJECT.
   ↓
3. OBTAIN FREE LINK STRUCTURE.
   ↓
4. SET POINTER IN LINK STRUCTURE TO ITEM OBJECT ADDRESS.
   ↓
5. OBTAIN ADDRESS OF CATEGORY OBJECT TO WHICH THE ITEM IS TO BE LINKED.
   ↓
6. SET POINTER IN LINK STRUCTURE TO CATEGORY OBJECT ADDRESS.
   ↓
7. SET POINTERS IN ITEM OBJECT AND CATEGORY OBJECT TO ADDRESS OF FIRST AND LAST LINK STRUCTURES IN THEIR RESPECTIVE CHAINS.
   ↓
8. SET POINTERS IN LINK STRUCTURE TO ADDRESSES OF EACH ADJACENT LINK STRUCTURE IN CROSS-LINKED DIAGRAM.
   ↓
9. SET POINTERS IN EACH OF THE ADJACENT LINK STRUCTURES.
   ↓
10. ARE THERE ANY OTHER CATEGORIES TO WHICH THE ITEM MUST BE LINKED? — YES → (back to step 3)
   ↓ NO
END

FIG. 7

INFORMATION MANAGEMENT SYSTEM

BACKGROUND OF THE INVENTION

This invention relates to the organization of and access to information stored in a computer system.

Computer systems frequently organize data into categories, usually called fields, each category having a number of items of information. The categories can be arranged in a hierarchical structure such that each category may include a "parent" category, one or more "sibling" categories, and one or more "children" categories. For example, a category called "Companies" may have as its children the categories "Financial Information" and "Personnel", and Personnel could have "Name", "Address" and "Salary" as its children. In this example, Financial Information and Personnel are sibling categories since they both have the same parent category, i.e., Companies. Similarly, Name, Address and Salary are siblings with Personnel as the common parent. The category hierarchy can continue to many levels or "generations."

Items are specific textual information such as a single word or several lines of text. Items appear in fields (i.e., under one of the available categories). Using the above example, the names of specific companies would appear under the category Company. Similarly, specific names of employees are under the category Names.

Prior art systems generally operate in two distinct modes, a data entry mode and a report writer or view mode. As its name implies, the data entry mode is used when data is to be entered, deleted or modified in any way. The user directly accesses the files in the data base and makes the desired changes.

SUMMARY OF THE INVENTION

The invention features a system for linking elements representing stored information in a data base, the system comprising: a link structure formed in a section of the data base independent of the elements; a pointer in the link structure indicating the location of a first element; and a second pointer in the link structure indicating the location of a second element. The first element belongs to a first group of elements and the second element belongs to a second group of elements. In the preferred embodiment the system includes a plurality of independent link structures, each of which has a pointer indicating the location of an element in the first group and a pointer indicating the location of an element in the second group. The first group of elements can represent items and the second group can represent categories. The elements are represented by objects, and each object includes a pointer indicating a location of a link structure. Link structures that include pointers to the same element form a chain of link structures, with each member of the chain indicating the location of the preceding and following members.

The invention also generally features a system for assigning an element in a data base to one or more of a plurality of categories, the categories hierarchically arranged such that each category may have one parent category and a predetermined number of children categories, the system comprising: means for assigning the element to a category in response to information input by a user; and means for automatically assigning the element to a second category, the second category being the parent category of the category to which it was assigned by the means for assigning. In the preferred embodiment the system further comprises means for automatically assigning the element to a third category, the third category being the parent category of the second category.

The invention also generally features a system for modifying data in a data base comprising: means for presenting data to a user in a view mode, the view mode providing a view comprising a compilation of selected portions of the data base that satisfy one or more criteria; means for receiving information input by the user through the view mode specifying a desired modification to the data being viewed; and means for modifying the data base in accordance with the input information. In the preferred embodiment the means for modifying the data base resolves ambiguities introduced by the received information by guessing as to the most likely interpretation intended by the user by utilizing data related to the data to be modified to resolve the ambiguities, the related data being data immediately adjacent to or preceding the data to be modified in the view.

The invention generally features a system for modifying a category structure of a data base, the category structure comprising a plurality of categories, the system comprising: means for presenting the data to a user in a view mode, the view mode providing a view comprising a compilation of selected portions of the data base that satisfy one or more criteria; means for receiving information input by a user through the view mode specifying a desired change to the category structure; and means for modifying the category structure in accordance with the input information. The desired change may comprise adding or deleting a category. The categories are arranged in a category hierarchy and the desired change may comprise moving a category within the hierarchy.

The invention further generally features a system for organizing data in a data base comprising: a plurality of items, the items comprising textual data; a plurality of categories into which the items may be categorized; and means for linking items to selected categories such that each item may be linked to more than one category. Each category can be linked to more than one item. In the preferred embodiment the system further comprises means for linking one of the categories to another of the categories.

The invention also generally features a system for modifying data in a data base comprising: means for receiving information input by a user specifying a desired modification to the data; means for modifying the data in response to the received information; means for identifying data in the data base that is related to the data modified by the means for modifying; and means for modifying the identified data in accordance with the received information. If the received information specifies a category to be modified within the data base, the means for identifying identifies categories related to said modified category. If the received information identifies information to be modified within a specified category, the means for identifying identifies categories that contain the information to be modified.

The invention provides a user with much greater flexibility in modifying and managing data than any system available in the prior art. Through the use of the unique link structures, items may be easily linked to many different categories, in contrast to prior art systems where items were in fields under specific categories. Items therefore exist independently of categories allowing much greater flexibility as explained more fully below. Users modify data through a view, and the system resolves ambiguities using available information to determine the most likely intent of the user. The data structure of the invention also allows side effects to be quickly resolved. The use of subsumption to automatically assign an item to the parent category of a category to which the item is directly assigned by the user further improves the performance of the system.

DETAILED DESCRIPTION OF THE PREFERRED EMBODIMENT

The invention is embodied in software commercially available under the registered trademark "Agenda", produced by Lotus Development Corporation of Cambridge, Mass., which has published the following documentation and software for Agenda ®, incorporated herein by reference: *Lotus Agenda User's Guide, Lotus Agenda Tutorial, Lotus Agenda Sample Applications, Lotus Agenda Definition Files* (all Copyright 1988 Lotus Development Corp., First Edition); and Lotus Agenda Install, Program, Utility, Applications, Help and Demo Disks (all Release 1.0, Copyright 1988 Lotus Development Corp.) for the IBM ® Personal Computer or certified compatible or IBM PS/2 ® series computer, with hard disk, 3½" or 5¼" floppy drive, 640 K. RAM and MS-DOS ®, version 2.0 or higher.

In order to illustrate how data is organized and accessed in accordance with the invention an illustrative category hierarchy will be described.

Figure 1:
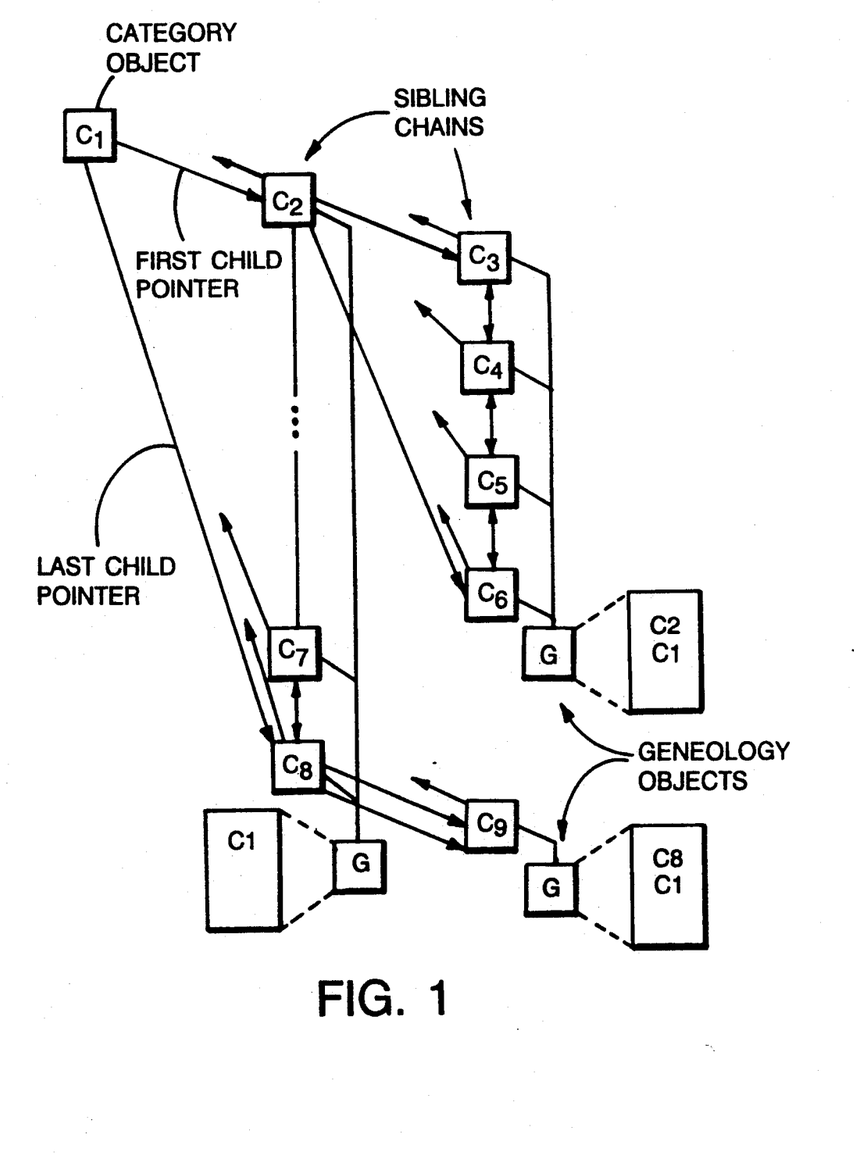
FIG. 1 illustrates a category hierarchy used in accordance with the invention.

Referring to FIG. 1, parent category $C_1$ is linked by means of pointers (represented by arrows) to its first child category $C_2$ and last child category $C_8$. Other children categories of $C_1$, $C_7$ for example, are linked between $C_2$ a $C_8$, to form a chain of categories. Each child category includes pointers, which can be thought of as backwards and forwards, to its nearest two (i.e., adjacent) siblings in the chain, and a pointer to its parent ($C_1$). The children categories of each of $C_2$'s children are similarly arranged. Accordingly, $C_2$ includes pointers to its first child $C_3$ and last child $C_6$, with each of $C_2$'s children including pointers to its nearest two siblings (e.g., $C_5$ points to $C_4$ and $C_6$) and to its parent ($C_2$). $C_8$ has only one child, $C_9$, and therefore has two pointers to $C_9$, since it is both the first and last child.

Associated with each chain of sibling categories is a genealogy ("G") which lists the "ancestors" of those categories. For example, the sibling chain system of $C_3$, $C_4$, $C_5$ and $C_6$ has as its ancestors categories $C_2$ and $C_1$. The genealogy is used to quickly determine all of the ancestors of any category in the linked sibling chain.

Categories, items and other elements such as genealogies and views are represented in the data base through the use of objects. An object is a section of memory that contains a plurality of pointers that point to or indicate other sections of memory as described more fully below. Each object also includes other information depending on the specific type of object. For example, an item object would include the item itself (i.e., the textual data) and a category object includes the name of the category.

Figure 2:
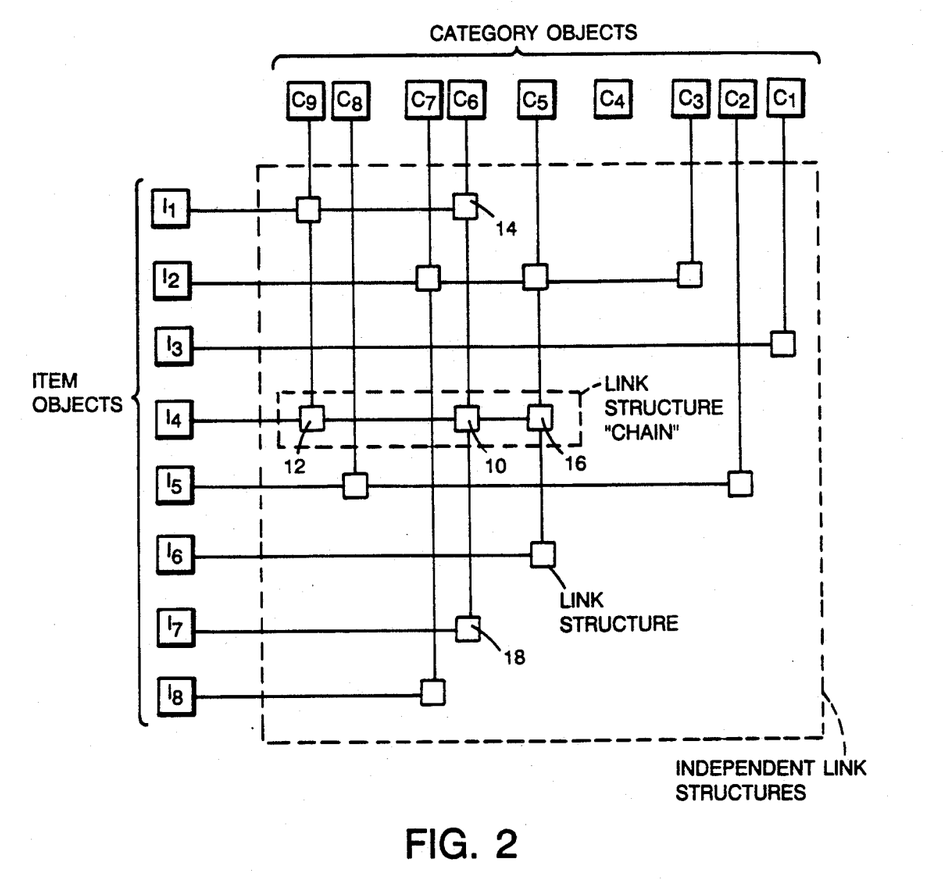
FIG. 2 is a diagrammatical representation of the linking of items to categories.

Unlike the prior art systems discussed above, items exist independently of the categories with which they are associated. In other words, they are not listed in fields that "belong" to one category. Instead they are linked to specified or logically determined categories through the use of link structures which are also independent. Referring to FIG. 2, each of items $I_1$–$I_8$ are linked to one or more of categories $C_1$–$C_9$ through link structures represented in FIG. 2 by small squares appearing at the intersection of each linked item and category pair. The item and category are diagrammatically the coordinates of the link structure. Accordingly, $I_1$ is linked to categories $C_9$ and $C_6$, $I_2$ is linked to categories $C_7$, $C_5$ and $C_3$ etc. FIG. 2 is referred to as a "cross-linked diagram."

Link structures are similar to objects in that each link structure comprises a section of memory consisting largely of pointers pointing to other sections of memory, with each link section being separate or independent from the elements that are linked.

Figure 3A:
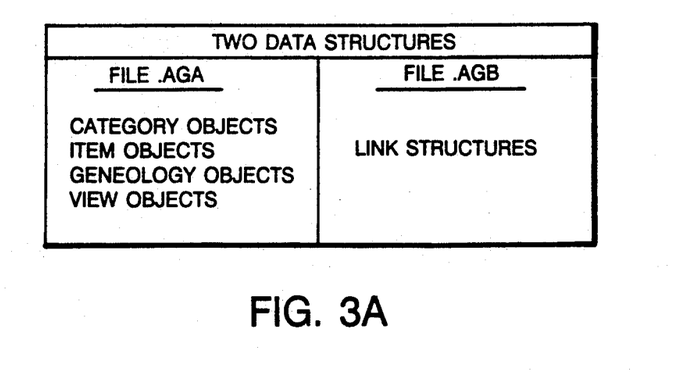
FIGS. 3A and 3B illustrate the storage of data in a data base.
Figure 3B:
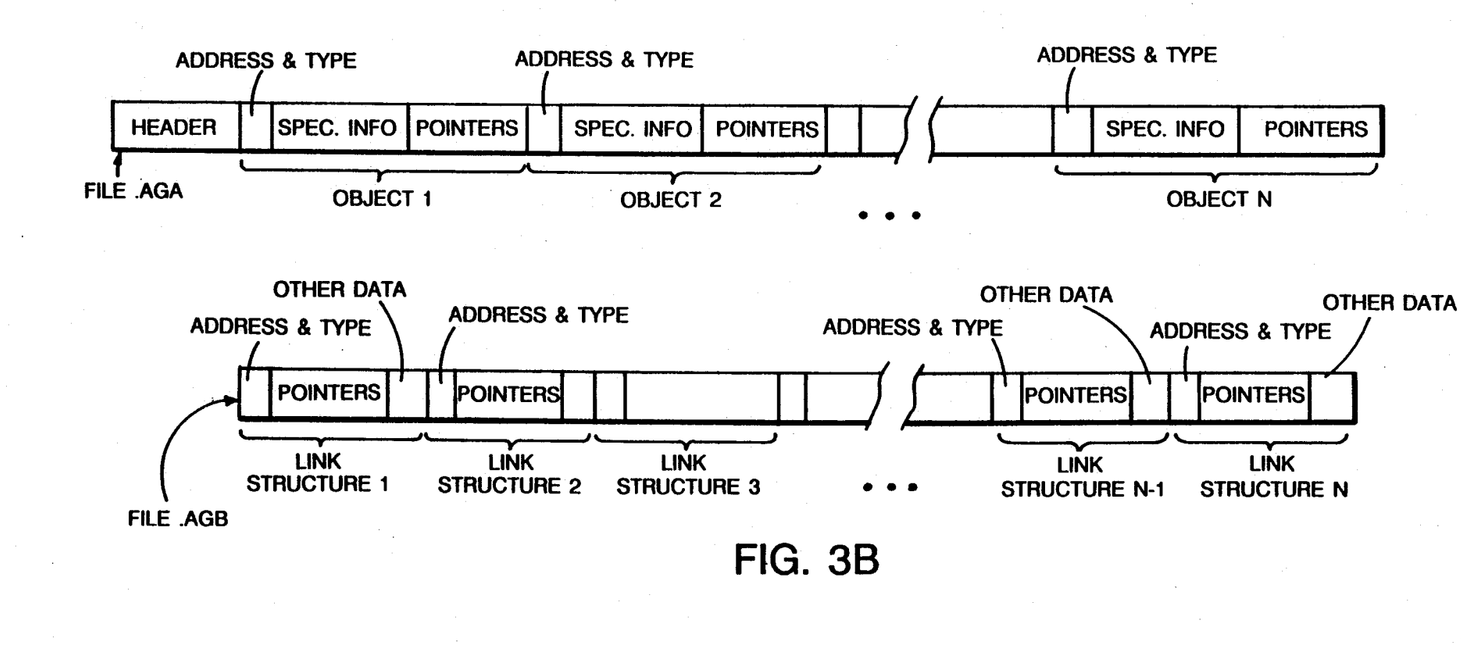

As shown in FIG. 3A, the data structure of the data base has two separate files for objects and link structures, designated by extensions .AGA and .AGB respectively, the structure of each being illustrated in FIG. 3B. Object file .AGA includes objects 1–N (N being any desired number within the memory limitations of the system). Each object includes an object address and type, object specific information, and a plurality of pointers. The object specific information varies depending on the specific type of element that the object represents. For example, if the object is an item object this information would include the textual data that makes up the item itself. A category object would include the name of the category, etc. The pointers assigned to each object also depend on the type of element that the object represents, as well as other factors. For example, and as discussed above, the pointers assigned to a category depend on its position in the category hierarchy, as well as its position in the cross-linked diagram.

Similarly, link structure file .AGB includes link structures 1–N. Each link structure includes the link structure address and type, a plurality of pointers, and may include other information described below. The link structure pointers depend on the link structure's position in the cross-linked diagram. For example, link 10 in FIG. 2 contains a pointer to the item object for $I_4$, the category object for $C_6$, and four pointers to the immediately adjacent link structures 12, 14, 16, and 18, in both chains to which it belongs.

Each item object includes a pointer to the first and last link structures in its chain. Therefore, if an item is being viewed, such as $I_4$, all of the categories to which this item is linked can quickly be determined by following the chain of link structures ($I_4$ points to link structure 12, which points to $C_9$ and to link structure 10 etc.). This structure also allows each item within a specified category to be quickly located. For example, if all of the items in $C_5$ need to be accessed, its chain is used in the same way.

Figure 4:
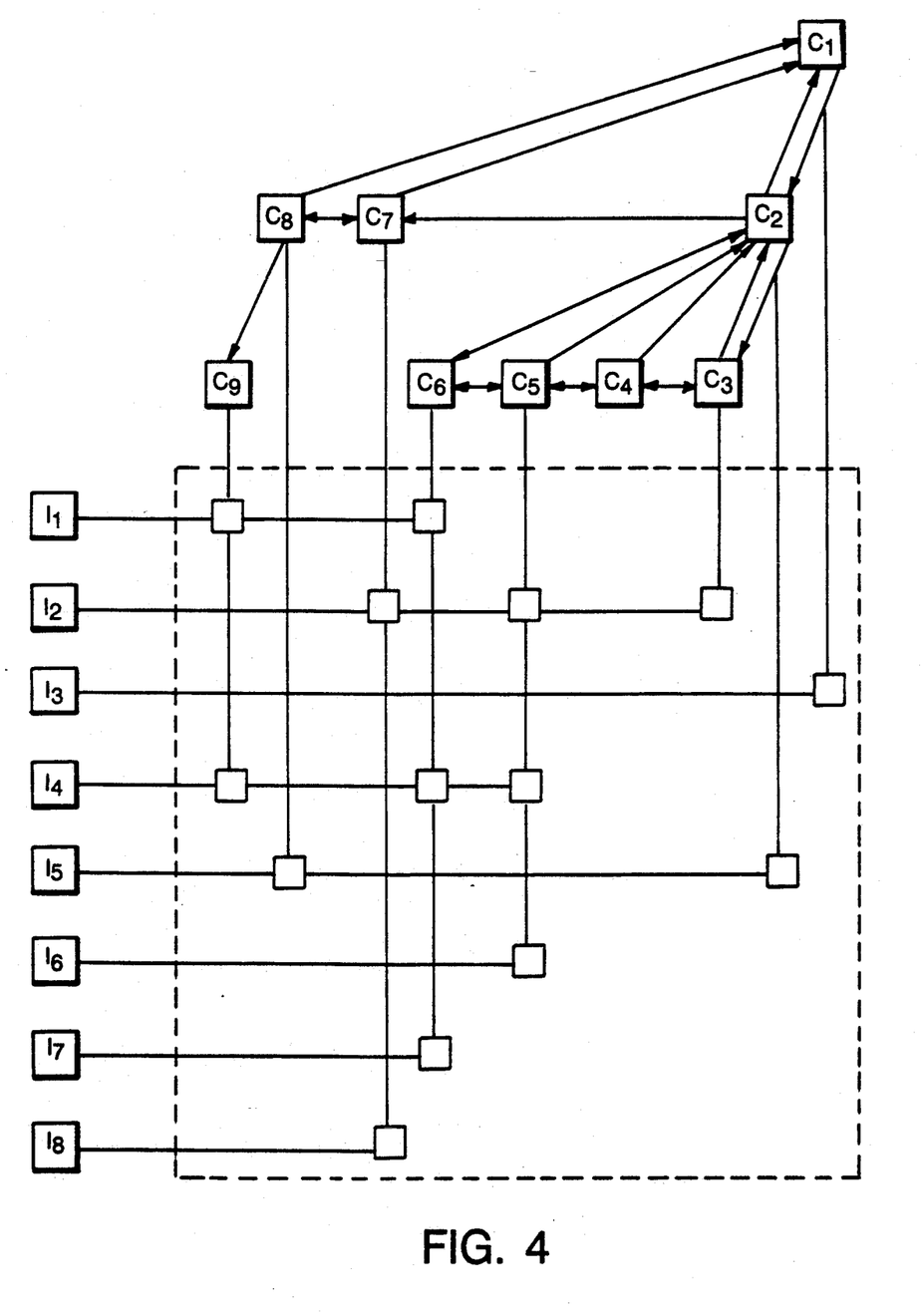
FIG. 4 is a combination of the diagrams illustrated in FIG. 1 and FIG. 2.

FIG. 4 combines FIGS. 1 and 2 to illustrate the linking of items to the category hierarchy. When an item is linked to a category the item is also linked by subsumption (also called "inheritance") to each ancestor of the category. For example, $I_4$ is linked to $C_9$, $C_6$ and $C_5$ directly and to $C_8$, $C_2$ and $C_1$ by subsumption. In other words, since $C_6$ and $C_5$ are subcategories or children of $C_2$, any item linked to $C_4$ or $C_5$ is automatically linked to $C_2$. Similarly, $C_2$ is a child of $C_1$ and $I_4$ must also be linked to $C_1$. The genealogy objects are used to quickly determine all the ancestors of a given category.

Figure 5:
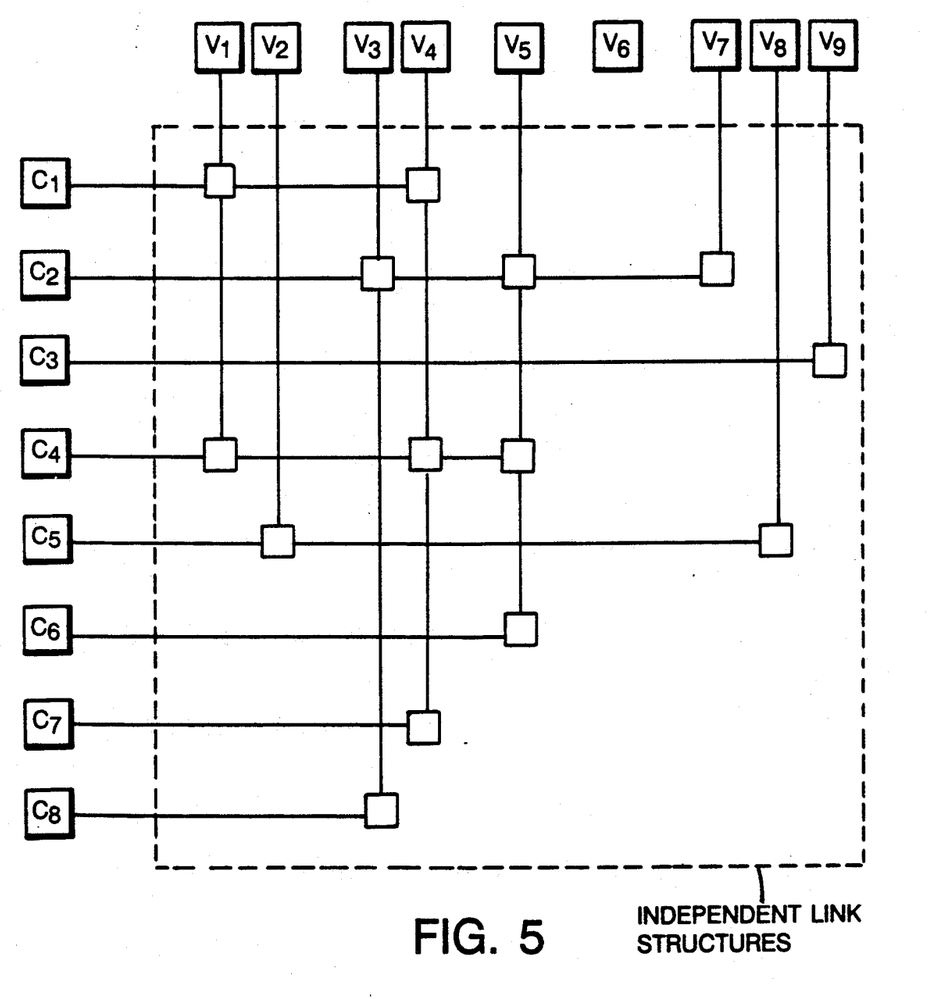
FIG. 5 is a diagrammatical representation of the linking of categories to views.

Link structures are also used to create views. Referring to FIG. 5, view objects $V_1$-$V_9$ (similar to category and item objects described above) are linked to any desired number of categories whose assigned items are to be viewed in a display. For example, $V_1$ comprises data from $C_1$ and $C_4$ while $V_2$ comprises data only from $C_5$. The link structures are the same as described above, and each would contain pointers to the category object and view object which it links as well as the nearest link structures (if any) in both chains. Each category object and view object contains a pointer to the first and last link structures in the chain to which it belongs.

Figure 6:
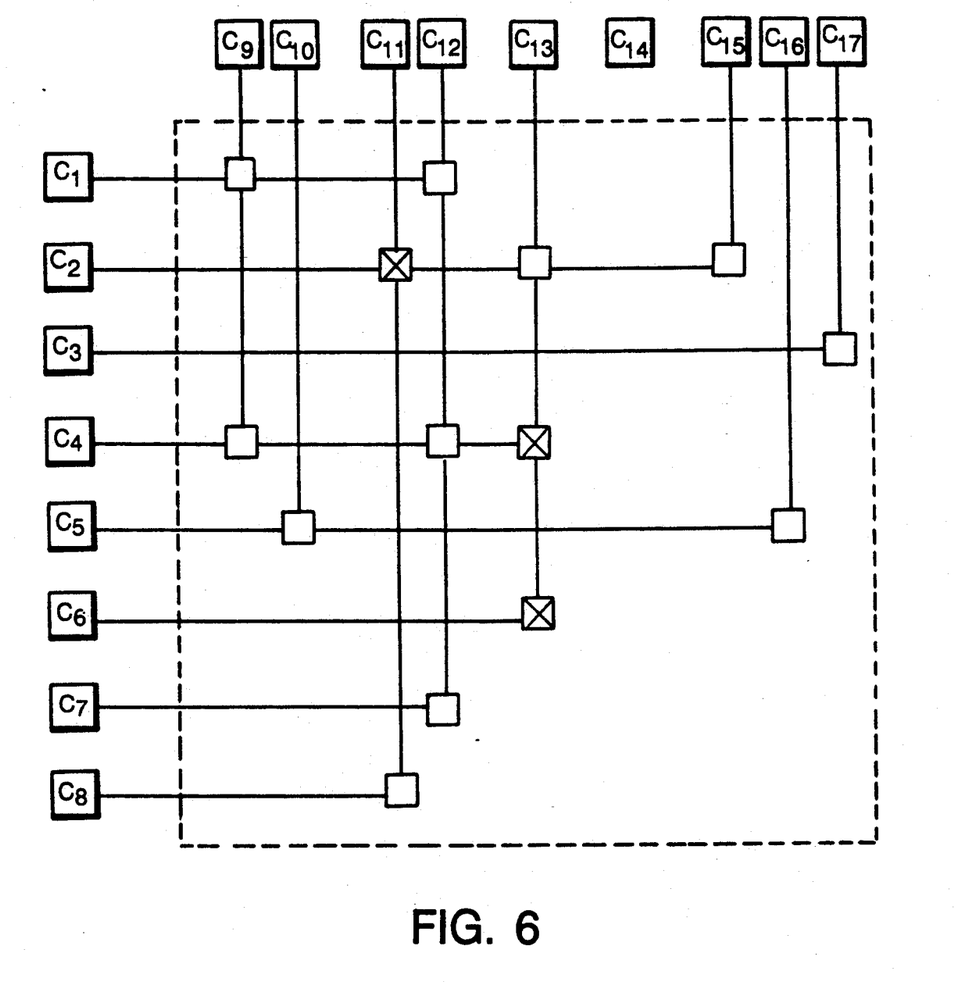
FIG. 6 is a diagrammatical representation of the linking of categories to categories.

Referring to FIG. 6, link structures are also used to link categories to other categories. For example, it may be desirable to have any or all items that are linked to one category automatically linked to another category. This can be accomplished by using a link structure to link the two categories together. Link structures can also contain information regarding the nature of the link. It may also be desirable to have all items that are not linked to one category automatically linked to another category. These "negative links" are illustrated by squares with an X. For example, categories $C_2$ and $C_{11}$ are negatively linked and no item can be linked to both $C_2$ and $C_{11}$.

Since the link structures, items and categories are all independent elements connected through the link structures, the system is extremely versatile allowing the data base to be easily modified (e.g., items and categories may be easily created, deleted or otherwise modified).

All modifications to the data base are performed through a view, each view comprising some desired combination of categories. A user makes a modification or enters new data by directly modifying the view. For example, a user may desire to add an item directly to a category in the view or may choose to add a new subcategory to a displayed category.

In the Agenda® implementation of the present invention, views are constructed as screens of information organized into sections having categories as section heads and items presented one after another beneath a given section head of the category to which the item has been assigned. A new item is entered into the database by entering or inserting its text under a given section head or category in the view on the screen. The category under which the item is entered is taken as the first category to which the new item is to be assigned.

The view can also have one or more columns to the right of the sections to indicate other categories or subcategories (e.g., "high", "medium" and "low" subcategories of the category "priority") to which the various items under a given section head are also assigned. Each column consists of a column head, which is a category, and one or more column entries which are also categories, for example, subcategories under the column head. The table below gives an example of a view.

| View: Activities | | |
|---|---|---|
| Calls | Priority | Contact |
| Set up meeting at Terracotta Corp to discuss CopyCat before the end of the month. | | |
| Don't forget to call Anna Lasky with the information she requested. | Medium | Anna Las |
| Call Marketing to arrange a Rapidfire demo for Abigail Scheer this Tuesday. | High | Abigail |
| Check with Abigail Scheer on meeting times. | Low | Abigail |
| Contact Daniel Fiske - get feedback! | Medium | Daniel F. |

The above view has one section with the section head "calls" and two columns with column heads "Priority" and "Contact", as specified by the view object. A new item "Setup meeting . . . " has just been entered by the user under "Calls". After entering the item, the user can make further assignments directly by moving to the columns of the view and entering an existing name of a subcategory under the column head. A new item is also screened or searched automatically to find words which match or nearly match existing category names. For example, in the above view, the assignment of the second item to the contact subcategory "Anna Las" would have been made automatically by means of the key word search of the item immediately after entry or modification.

Figure 7:
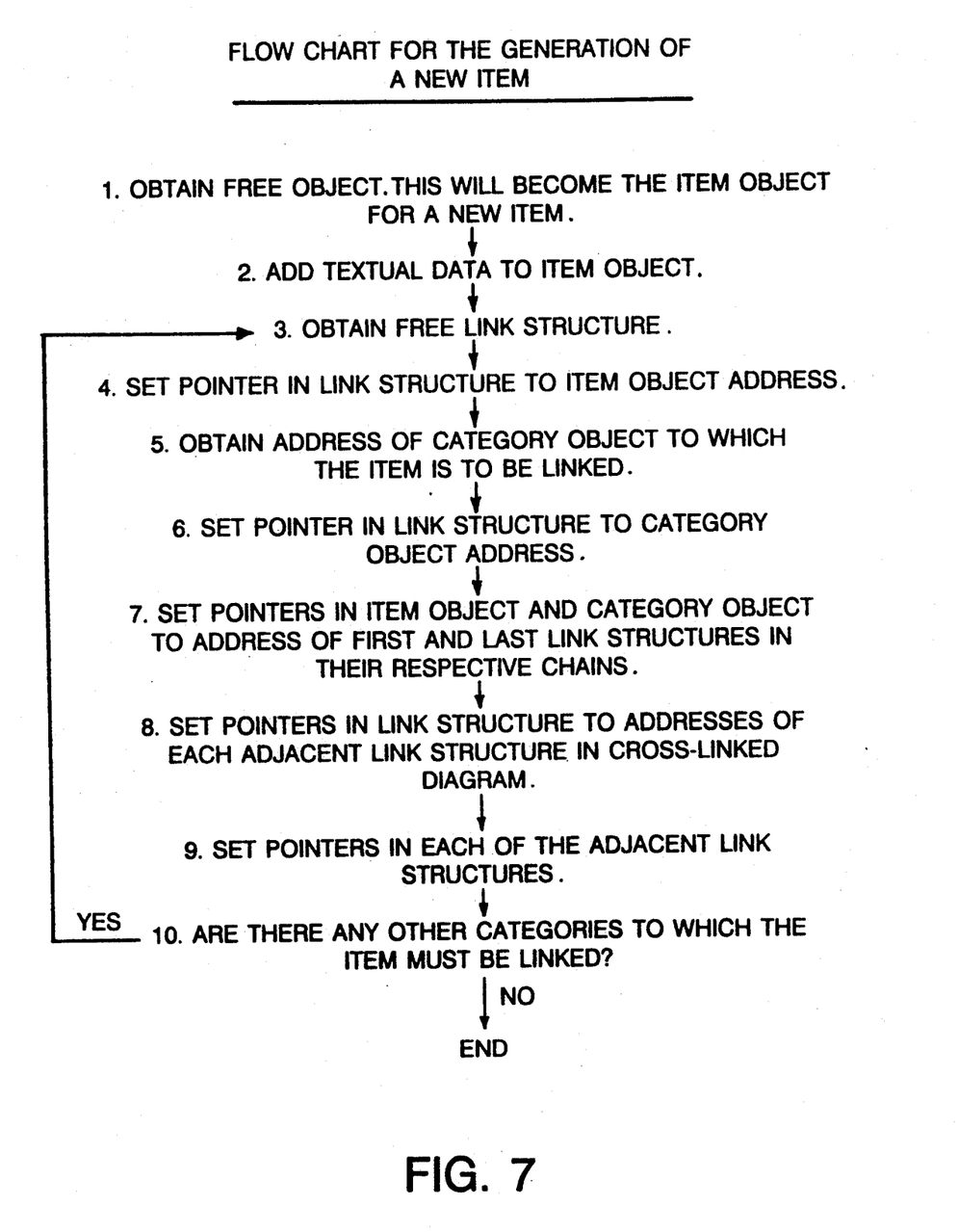
FIG. 7 is a flowchart illustrating the modification of data in a data base.

FIG. 7 is a flowchart that illustrates the steps performed by the system when a user wishes to add a new item to the database. A "free" object must be obtained from the .AGA file (step 1). An object is free if it has not yet been used or if the element it once represented was deleted. The textual data that makes up the item itself (e.g., an employee's name) is added to the object (step 2). The system must then link the item object into the data base (i.e., into the cross-linked diagram shown in FIG. 2). A free link structure is obtained from the .AGB file (step 3) and a pointer in the link structure is set to point to the address of the item object (step 4).

The category object address of the category to which the item object is to be linked must now be obtained (step 5). When a user enters an item in a view, he enters the item directly into a specific category, so the first link established for the item in the cross-linked diagram will be to this category, and a pointer in the link structure is set to the category object address (step 6).

As discussed above, each object includes pointers to the first and last link structures in its chain in the cross-linked diagram. Therefore, these pointers must be updated whenever a link is added to an object's chain (step 7). Since the item is new, both its first and last link structure pointers will point to the same link structure (there is only one link structure so far). Next, the pointers in the link structure that point to the four adjacent link structures must be properly set (step 8). Note that there may be fewer than four adjacent link structures depending on the link structure's position in the cross-linked diagram.

Finally, pointers in adjacent link structures to the currently added link structure must also be set since, as noted above, each link structure points to adjacent link structures (step 9).

This completes the linking of the item to the first category. There may, however, be additional categories to which links must be established. For example, two categories may be directly linked together (see FIG. 6) such that an item linked to one must be linked to the other. Furthermore, logical criteria can be used to directly assign items to categories. For example, the preferred system uses a key word search in assigning items to categories. Consider a category called "John Smith." The system can automatically assign an item to this category if the words John Smith appear in the item. Therefore, if a user is looking at a view that has a category called "Meetings" and he enters the item "Meet with John Smith on Tuesday", this item would be linked to both the category Meetings and the category John Smith.

Accordingly, once the first link is established, the system will determine whether an additional category is to be linked to the item (step 10). If not, then the process is complete. If there is an additional category, the system returns to step 3 and repeats the process.

Other modifications to the data are performed similarly. The linking of any element to the cross-linked diagram involves obtaining a free object, and linking it through link structures to the appropriate place in the cross-linked diagram. Deleting an item or category is the reverse process. Each link must be broken and any affected pointers (e.g., adjacent link structure pointers) must be revised.

Categories can be created or inserted by getting a free category object and adding the appropriate pointers to insert it at a desired location in the category hierarchy. Of course, related category objects will also need to be modified to accommodate the new category. For example, if a category is inserted as the first category in a chain of siblings, the parent category object will need to be modified since it must have a pointer to its first child. The new category is then linked into the cross-linked diagram utilizing the necessary link structures.

Through the use of independent link structures, there is a "many to many" linking or mapping of elements achieved with the invention. In the prior art an item was a part of one category and existed only within that category. In the present invention, however, items and categories are separate and independent entities and a single item may be linked to many categories.

The invention performs modifications while the system is in a view mode. If changes made in the view mode produce any ambiguities, the system will resolve the ambiguities using a "best guess method." One way in which an ambiguity could arise is where a category is by definition the union (boolean OR) of two otherwise unrelated categories. To maintain the truth of the category relationship, the item must be assigned to at least one of the OR'ed categories. The choice is inherently ambiguous. If a new item is inserted and the system must choose between two categories in which to place the new item, it will put the item in the category corresponding to the immediately preceding item in the same view since it is likely that adjacent items in a view are related. If there is no preceding item then the following item may be used. The system could also choose the category that was first created, or the one with the most assigned items etc. By attempting to resolve the ambiguity without asking the user to perform elaborate programming, the system provides greater freedom in modifying data.

The cross-linked model used with the present invention allows side effects resulting from the modification of data in a view to be quickly resolved. For example, referring to FIG. 4, if $C_5$ is deleted each of the link structures in its chain will be quickly found and eliminated. For example, the link structure linking $I_6$ to $C_5$ will be eliminated, and $I_6$ will no longer be linked to $C_5$, or to $C_2$ and $C_1$ (it would have been linked to these two categories by subsumption). If a user was viewing either categories $C_2$ or $C_1$ the side effect associated with eliminating $C_5$, namely the deletion of $I_2$ from $C_1$ and $C_2$, would be quickly resolved.

Other embodiments of the invention are within the scope of the appended claims.

We claim:

1. An item/category database system, comprising
means for storing independent data objects including category objects, item objects and view objects, along with networks of independent link structures, said category and item objects each containing character string representations of categories and items, respectively, and pointers to certain ones of said link structures, said link structures containing essentially only pointers to data objects and/or other link structures serving thereby to interconnect item and category objects in one cross-linked network representing a relationship between categories and their assigned items, and view and category objects in another cross-linked network,
means for defining views in relation to view objects, each view comprising at least one section of items assigned to a category represented by a particular category object to which a respective view object is linked within said another cross-linked network,
means for visually representing a defined view by displaying separately in each section each item of alphanumeric information represented respectively in each of the item objects already linked to the particular category object corresponding to the section,
means for entering new information into the database within the context of any given view by accepting new alphanumeric information as a free form character string entered under a section in the given view, storing a digital representation of said character string in a new item object and linking the new item object with the particular category object corresponding to said section by means of a new independent link structure within said one cross-linked network, and
means for further associating said new item object with pre-existing category objects by examining the character string of the new item object to match portions thereof with other category objects and linking the new item object to said other category objects via new respective link structures within said one cross-linked network.

2. The system of claim 1, wherein said category objects have pointers to other category objects in a hierarchy such that at least some category objects have subcategory objects in a parent/children relationship, said means for defining a view having means for further defining the view as comprising at least one column corresponding to at least one section of items of the view, said column being associated with another category object, said means for displaying a representation of the view having means for displaying in each column for each item in the corresponding section alphanumeric information represented in any subcategory object, to which the item is assigned, having a child relationship with the category object corresponding to the column.

3. The system of claim 2, further comprising means for forcing assignment of an item in a section of a view to another category by accepting a string of characters representing a designated category object entered in a location under a column corresponding to a particular item and linking a corresponding item object to the designated category object by means of a new link structure within said one cross-linked network.

4. In an item/category database for manipulation by a user on an electronic computer system having a programmed computer, a data storage facility and a user interface including a data entry mechanism and a display screen, the system comprising the steps of storing in said data storage facility independent data objects including category objects, item objects and objects, along with networks of independent link structures, said category and item objects each containing character string representations of categories and items, respectively, and pointers to certain ones of said link structures, said link structures containing essentially only pointers to data objects and/or the link structures serving thereby to interconnect item and category objects in one cross-linked network representing a relationship between categories and their assigned items, and view and category objects in another cross-linked network, a user defining views in relation to view objects via said data entry mechanism, each view comprising at least one section of items assigned to a category represented by a particular category object to which a respective view object is linked within said another cross-linked network, visually representing on said display screen a defined view by displaying separately in each section each item of alphanumeric information represented respectively in each of the item objects already linked to the particular category object corresponding to the section, entering new information into the database within the context of any given view by the programmed computer accepting new alphanumeric information as a free form character string entered by a user via said data entry mechanism under a section in the given view, storing in said data storage facility a digital representation of said character string in a new item object and linking the new item object with the particular category object corresponding to said section by means of a new independent link structure within said one cross-linked network, and further associating said new item object with pre-existing category objects by the programmed computer examining the character string of the new item object to match portions thereof with other category objects and linking the new item object to said other category objects via new respective link structures within said one cross-linked network.

5. The system of claim 4, wherein said category objects have pointers to other category objects in a hierarchy such that at least some category objects have subcategory objects in a parent/children relationship, said step of defining a view including the user defining the view as comprising at least one column corresponding to at least one section of items of the view, said column being associated with another category object, the step of displaying a representation of the view including displaying on said display screen in each column for each item in the corresponding section alphanumeric information represented in any subcategory object, to which the item is assigned, having a child relationship with the category object corresponding to the column.

6. The system of claim 5, further comprising the programmed computer forcing assignment of an item in a section of a view to another category by accepting a string of characters representing a designated category object entered in a location under a column corresponding to a particular item and linking a corresponding item object to the designated category object by means of a new link structure within said one cross-linked network.

7. The system of claim 4, further comprising in the event that said step of further associating said item object with pre-existing category objects would result in an ambiguous assignment as between two categories, the programmed computer resolving the ambiguity by reference to the assignment of an adjacent item in the same section and linking the new item object via new respective link structures within said one cross-linked network to the same one of the two category objects to which the adjacent item is linked.

* * * * *

UNITED STATES PATENT AND TRADEMARK OFFICE
CERTIFICATE OF CORRECTION

PATENT NO. : 5,115,504
DATED : May 19, 1992
INVENTOR(S) : Belove, et al

It is certified that error appears in the above-indentified patent and that said Letters Patent is hereby corrected as shown below:

Column 3, line 52, "a" (first occurrence) should be --and--.
line 60, after "$(C_2)$", insert a period.
Column 9, line 33, claim 4, "the" should be --other--.

Signed and Sealed this

Fourteenth Day of September, 1993

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,115,504
DATED : May 19, 1992
INVENTOR(S) : Belove, et al

It is certified that error appears in the above-indentified patent and that said Letters Patent is hereby corrected as shown below:

On the title page, item [56], Other Publications, add: Lotus Metro, "Chapter 9 List Manager".

Signed and Sealed this

Twenty-seventh Day of September, 1994

Attest:

BRUCE LEHMAN

Attesting Officer　　　Commissioner of Patents and Trademarks